(12) United States Patent
Suzuki (10) Patent No.: US 10,705,489 B2
(45) Date of Patent: Jul. 7, 2020

(54) CONTROLLER

(71) Applicant: FANUC CORPORATION, Yamanashi (JP)

(72) Inventor: Yoshiyuki Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 342 days.

(21) Appl. No.: 15/883,634

(22) Filed: Jan. 30, 2018

(65) Prior Publication Data

US 2018/0217567 A1 Aug. 2, 2018

(30) Foreign Application Priority Data

Jan. 31, 2017 (JP) .................................. 2017-015489

(51) Int. Cl.
*G05B 13/02* (2006.01)
*G05B 19/425* (2006.01)
*G05B 19/402* (2006.01)

(52) U.S. Cl.
CPC ....... *G05B 13/0265* (2013.01); *G05B 19/402* (2013.01); *G05B 19/425* (2013.01);
(Continued)

(58) Field of Classification Search
CPC combination set(s) only.
See application file for complete search history.

(56) References Cited

U.S. PATENT DOCUMENTS

2008/0250359 A1  10/2008  Sagara et al.
2016/0059413 A1*  3/2016  Ogata ................... B25J 9/1676
                                                    700/186

(Continued)

FOREIGN PATENT DOCUMENTS

CN       104898470 A       9/2015
CN       105382836 A       3/2016

(Continued)

OTHER PUBLICATIONS

Notification of Grant in CN Application No. 201810090498.3, dated Nov. 14, 2019, 8pp.

(Continued)

*Primary Examiner* — Bhavesh V Amin
(74) *Attorney, Agent, or Firm* — Hauptman Ham, LLP (57) ABSTRACT

A controller that allows reteaching of a machine made up of a plurality of mechanisms to be easily performed is provided. The controller includes a machine position acquiring section that acquires the current positions of mechanisms, a reteach block search section that assigns rank order numbers to linkage information that indicates linkage between blocks of a plurality of machine control programs on the basis of relation between the current positions of the mechanisms and taught positions in blocks in the machine control programs that are indicated as being linked to one another by the linkage information, a search result output section that outputs blocks relating to the linkage information on the basis of the rank order numbers assigned by the reteach block search section, and a reteach result reflecting section that reflects, in blocks of the plurality of machine control programs that are selected as blocks to be retaught, the current positions of the mechanisms as positions to be retaught.

6 Claims, 8 Drawing Sheets

(52) U.S. Cl.
CPC ............. *G05B 2219/34013* (2013.01); *G05B 2219/39295* (2013.01)

(56) References Cited

U.S. PATENT DOCUMENTS

| | | |
|---|---|---|
| 2016/0179083 A1 | 6/2016 | Yamaguchi |
| 2016/0202687 A1* | 7/2016 | Saitou .................. G05B 19/425 700/61 |

FOREIGN PATENT DOCUMENTS

| | | |
|---|---|---|
| CN | 105785920 A | 7/2016 |
| JP | S58-155188 A | 9/1983 |
| JP | H1-106110 A | 4/1989 |
| JP | H05134738 A | 6/1993 |
| JP | H6-270082 A | 9/1994 |
| JP | 2002-182715 A | 6/2002 |
| JP | 2008-257366 A | 10/2008 |
| JP | 2016-118888 A | 6/2016 |

OTHER PUBLICATIONS

Office Action in JP Application No. 2017-015489, dated Sep. 4, 2018, 8pp.

\* cited by examiner

| | MECHANISM1 | MECHANISM2 | MECHANISM3 | MECHANISM4 |
|---|---|---|---|---|
| WAIT[1] | POSITION[12] | POSITION[22] | POSITION[32] | POSITION[42] |
| WAIT[2] | POSITION[13] | POSITION[23] | POSITION[34] | POSITION[44] |
| WAIT[3] | ⋮ | ⋮ | ⋮ | ⋮ |
| WAIT[4] | ⋮ | ⋮ | ⋮ | ⋮ |
| ⋮ | ⋮ | ⋮ | ⋮ | ⋮ |

FIG.4

| | MECHANISM1 | MECHANISM2 | MECHANISM3 | MECHANISM4 | RANK ORDER |
|---|---|---|---|---|---|
| WAIT[1] | POSITION[12] | POSITION[22] | POSITION[32] | POSITION[42] | 2 |
| WAIT[2] | POSITION[13] | POSITION[23] | POSITION[34] | POSITION[44] | 1 |
| WAIT[3] | ⋮ | ⋮ | ⋮ | ⋮ | ⋮ |
| WAIT[4] | ⋮ | ⋮ | ⋮ | ⋮ | ⋮ |
| ⋮ | ⋮ | ⋮ | ⋮ | ⋮ | ⋮ |
| CURRENT POSITION | P1 | P2 | P3 | P4 | — |

CONTROLLER

RELATED APPLICATIONS

The present application claims priority to Japanese Application Number 2017-015489, filed Jan. 31, 2017, the disclosure of which is hereby incorporated by reference herein in its entirety.

BACKGROUND OF THE INVENTION

Field of the Invention

The present invention relates to a controller and, in particular, to a controller that proposes blocks to be retaught for a machine made up of a plurality of mechanisms.

Description of the Related Art

Figure 8:
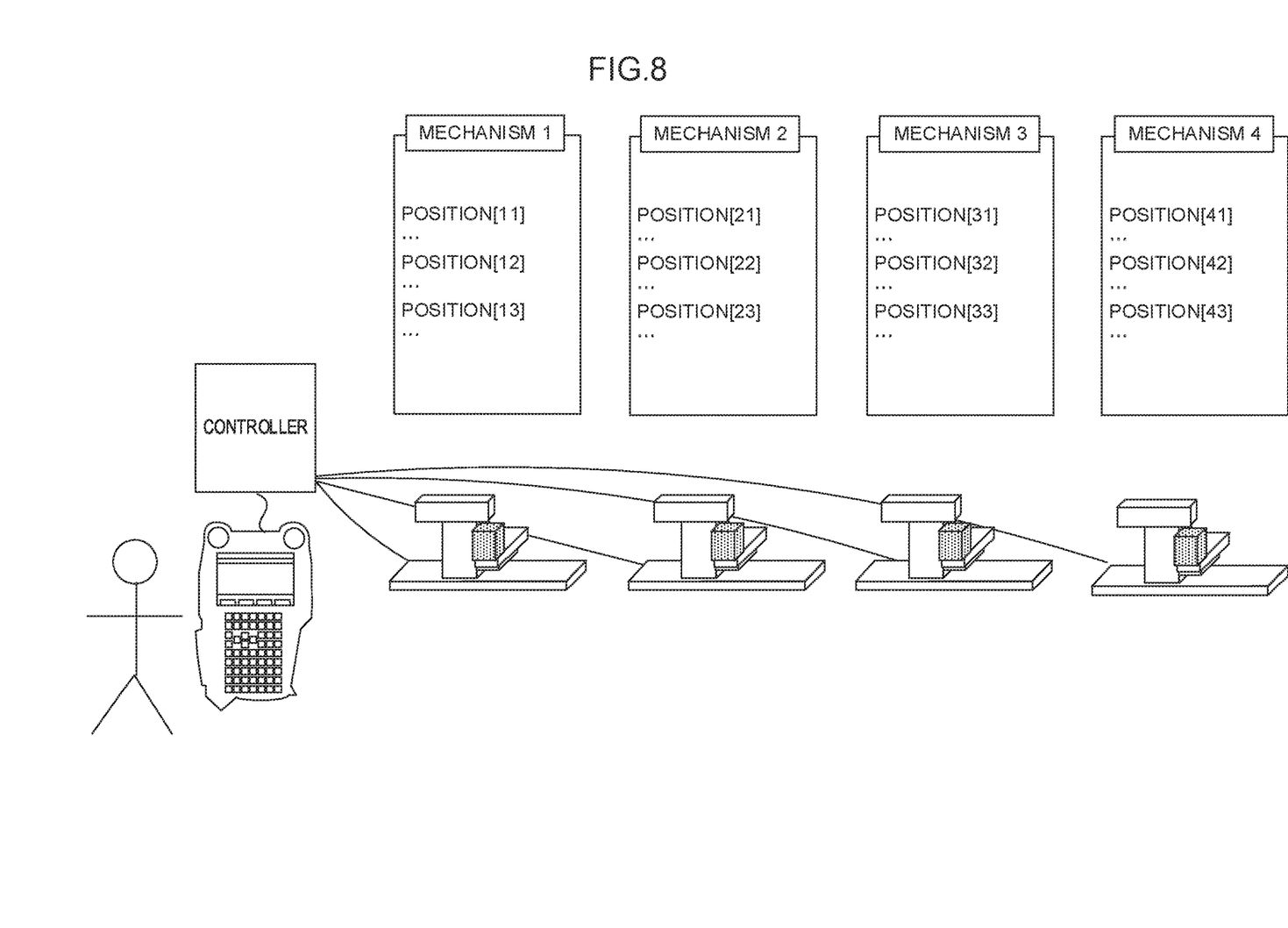
FIG. 8 is a diagram illustrating an example in which a program is written for each of a plurality of mechanisms.
Figure 9:
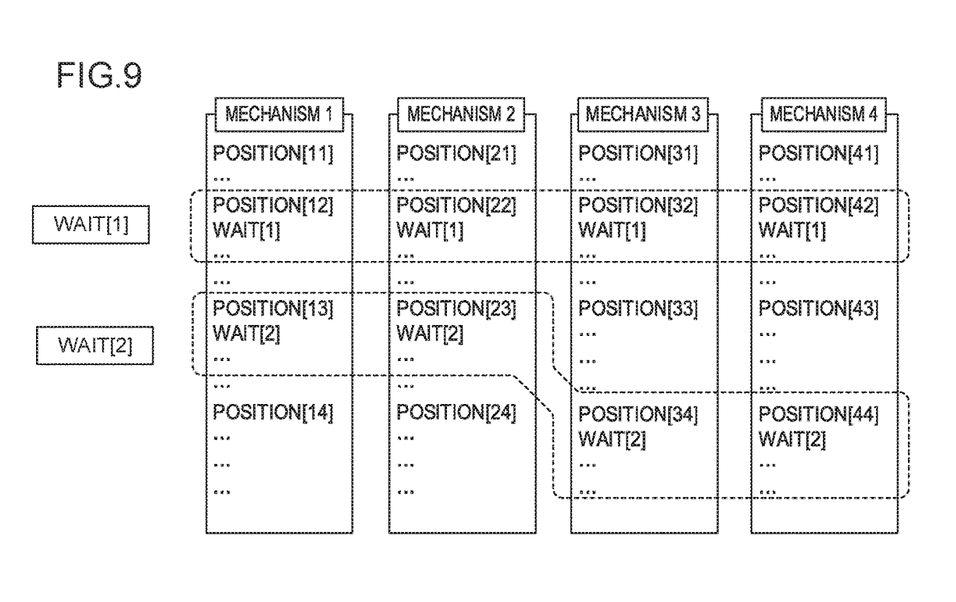
FIG. 9 is a diagram illustrating an example in which positions are taught while inserting wait information in a program for each of a plurality of mechanisms.

When a teaching/playback machine control program is written for a machine made up of a plurality of mechanisms, a program may be written for each of the mechanisms as illustrated in FIG. 8 in order to maintain the independence of each mechanism or for other reasons. When a teaching/playback machine control program has been written for each of a plurality of mechanisms, positions are taught while inserting wait information in the program for each mechanism, as illustrated in FIG. 9.

Figure 10:
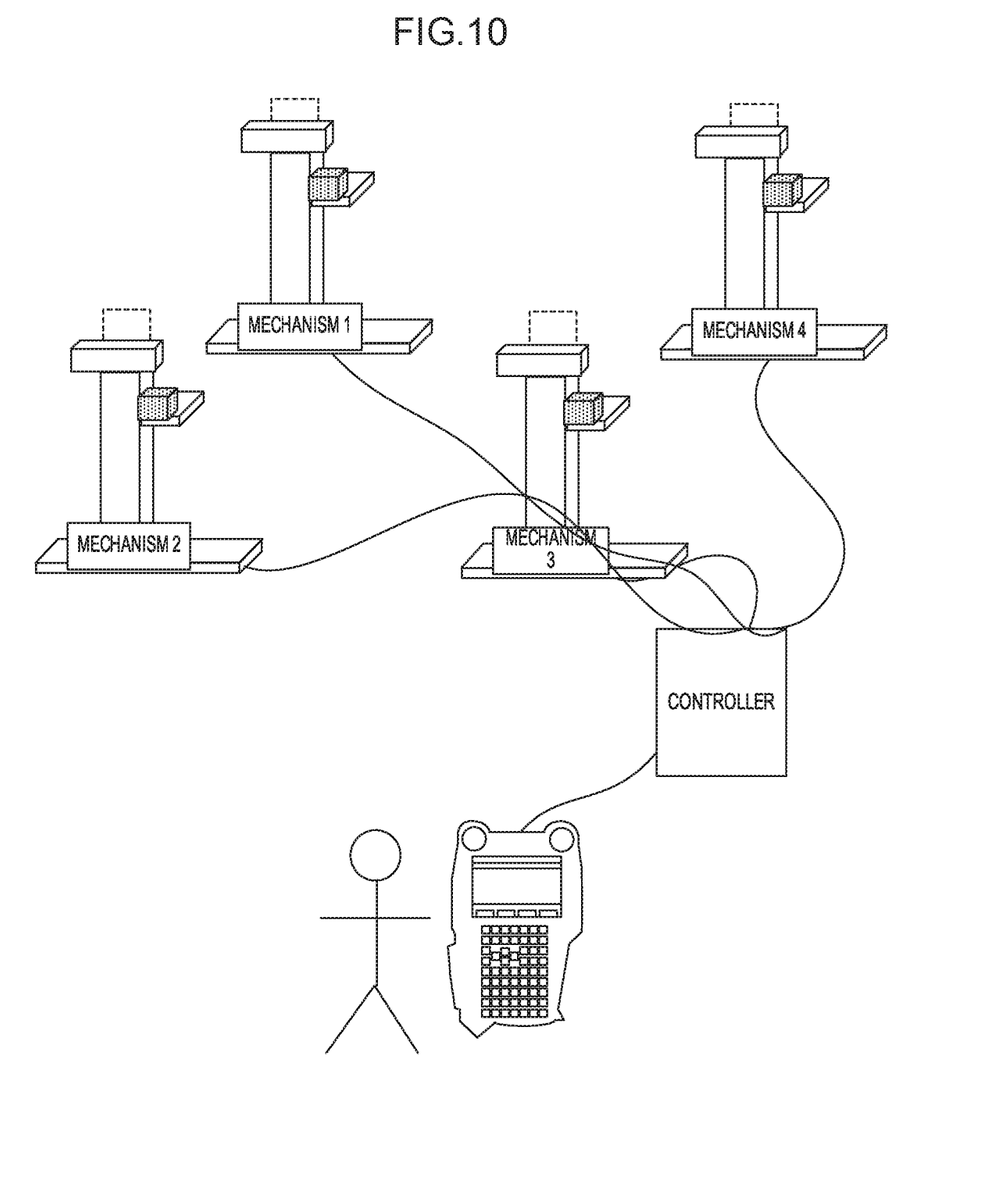
FIG. 10 is a diagram illustrating an example in which there are differences in setup positions of a plurality of mechanisms from factory settings.

For machines that are taught by using a teaching/playback method, it is often the case that desired programs are taught once to the machine from start to end and are activated at the supplier's factory prior to shipment, then the programs are re-set up at a customer's factory while the machine is checked. Setup at the supplier's factor and setup at the customer's factory may differ in setup positions as illustrated in FIG. 10 (dashed lines in the example in FIG. 10 indicate differences appeared after activation at the customer's factory). In such a case, a teaching operator performs fine-adjustments (reteaching) to correct differences from the originally taught positions while checking the machine at the customer's factory.

In general, to correct (reteach) a taught position of a machine, the following operations are performed.
Operation 1: Move each mechanism to a desired position to be retaught.
Operation 2: Move a cursor displayed on a screen to a block in which the reteaching is performed.
Operation 3: Perform an operation to reteach the taught position in a block on which the cursor is placed.

Figure 11:
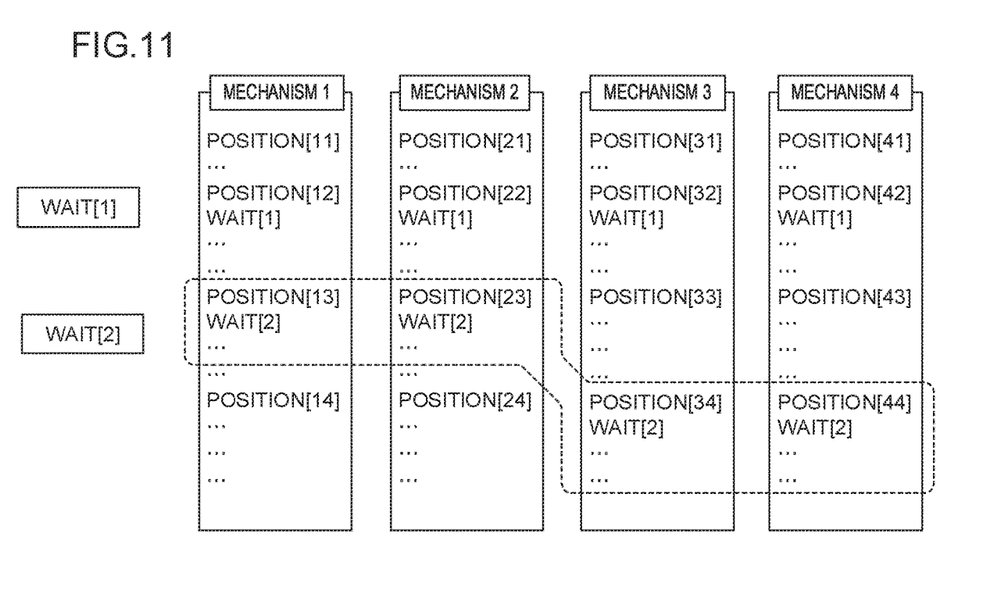
FIG. 11 is a diagram for explaining a procedure of reteaching each of a plurality of mechanisms.

For example, to reteach coordinate values of each mechanism in wait [2] in machine control programs illustrated in FIG. 11, the teaching operator moves the position of each mechanism to the position to be retaught, then places the cursor on position [13] in the program for mechanism 1, on position [23] in the program for mechanism 2, and on position [34] in the program for mechanism 3, and on position [44] in the program for mechanism 4 before performing a reteaching operation.

Note that as an existing technique to assist correcting taught positions in a program, a technique is known which is described in Japanese Laid-Open Patent No. 05-134738, in which when correcting a taught position, an operator moves a robot to a position to which the taught position is to be changed and inputs a program search command into a controller, then the controller searches a program for a taught position that is close to the position of the robot and displays the taught position.

However, the technique has a problem that the cursor of the program for every mechanism to be retaught needs to be moved to a block in which reteaching is to be performed, the operation is significantly burdensome for the teaching operator.

Further, the use of the existing technique described in Japanese Laid-Open Patent No. 05-134738 cannot sufficiently save the teaching operator time and trouble because for example when positions in different waits in the same mechanism are close to each other, the teaching operator has to check whether the cursor has moved to a correct block while operating.

SUMMARY OF THE INVENTION

Therefore, an object of the present invention is to provide a controller that allows reteaching of a machine made up of a plurality of mechanisms to be easily performed.

The present invention solves the problem by using linkage information indicating blocks to be linked to one another across mechanisms that is preset in programs for the mechanisms and, during reteaching, comparing a combination of "taught positions for mechanisms" in blocks relating to each piece of linkage information (which are linked by the linkage information) with a combination of positions of the mechanisms, and proposing a combination of blocks whose integrated distances are close to each other to a teaching operator as a candidate to be retaught.

A controller according to the present invention is a controller that reteaches taught positions in blocks contained in a plurality of machine control programs for controlling a plurality of mechanisms, each of the plurality of machine control programs including at least one piece of linkage information that indicates linkage between blocks of the machine control programs, the controller including: a machine position acquiring section that acquires current positions of the mechanisms; a reteach block search section that assigns rank order numbers to the linkage information on the basis of relation between the current positions of each of the mechanisms acquired by the machine position acquiring section and a taught position in a block of the plurality of machine control programs that relates to the linkage information; a search result output section that outputs blocks of the plurality of machine control programs that relate to the linkage information on the basis of the rank order numbers assigned by the reteach block search section; and a reteach result reflecting section that reflects, in blocks of the plurality of machine control programs that have been selected as blocks to be retaught among the blocks output by the search result output section, the current positions of the mechanism that have been obtained by the machine position acquiring section as positions to be retaught. In the controller described above, the linkage information is wait identification information of wait blocks.

The controller includes a teaching information management table in which the linkage information and taught positions in blocks of the plurality of machine control programs that are indicated by the linkage information as being linked to one another are associated with each other and managed.

In the controller, the reteach block search section assigns rank order numbers to blocks of the plurality of machine control programs on the basis of proximity between the current position of each of the mechanisms acquired by the machine position acquiring section and a taught position in a block of the plurality of machine control programs that relates to the linkage information. In the controller, the reteach block search section determines the proximity on the basis of a result of summation of three-dimensional distances between the current position of each of the mechanisms acquired by the machine position acquiring section and a taught position in a block of the plurality of machine control programs that relates to the linkage information.

In the controller, the reteach block search section determines the proximity on the basis of a result of summation of weighted three-dimensional distances between the current position of each of the mechanisms acquired by the machine position acquiring section and a taught position in a block of the plurality of machine control programs that relates to the linkage information.

In the controller, the reteach block search section determines the proximity on the basis of the number of mechanisms whose current positions acquired by the machine position acquiring section are identical to taught positions in blocks of the plurality of machine control program that relate to the linkage information.

The present invention enables reteaching of wait blocks for a plurality of mechanisms without the need for moving cursors in programs for all of the mechanisms to be retaught to blocks to be retaught.

BRIEF DESCRIPTION OF THE DRAWINGS

The above and other objects and features of the present invention will be apparent from the following description of example embodiments taken in conjunction with the accompanying drawings, in which.

DETAILED DESCRIPTION OF THE PREFERRED EMBODIMENTS

Example embodiments of the present invention will be described below with reference to drawings.

Figure 1:
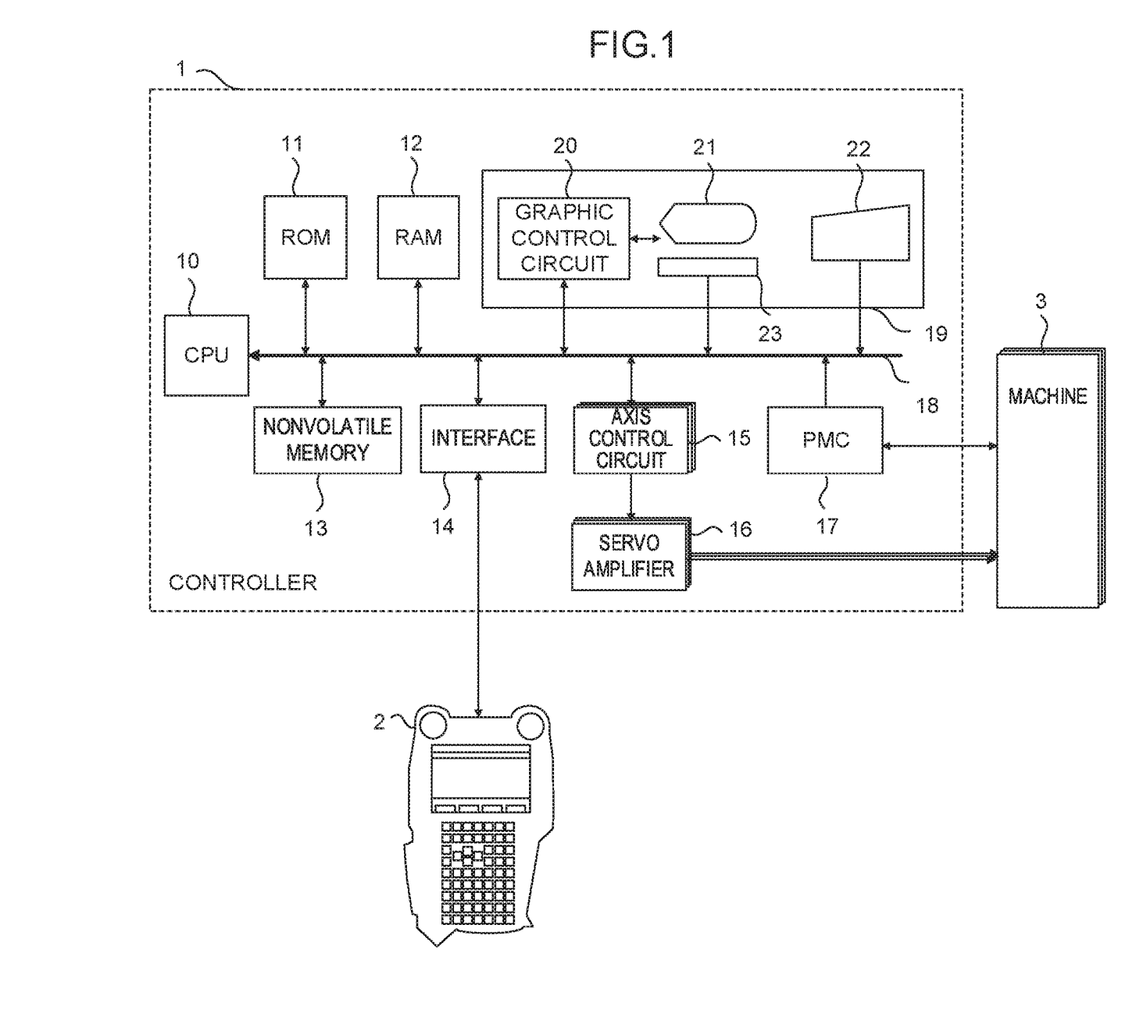
FIG. 1 is a schematic hardware configuration diagram of a controller according to an example embodiment of the present invention.

FIG. 1 is a hardware configuration diagram illustrating a main part of a controller according to an example embodiment of the present invention.

The controller 1 is configured with a CPU 10 at its center. The CPU 10 controls the entire controller 1 in accordance with a system program stored on a ROM 11. An EPROM or an EEPROM is used as the ROM 11.

A DRAM or the like is used as a RAM 12, in which temporary computation data, display data, input and output signals, and other data are stored. A CMOS or an SRAM or the like backed up by a battery, not depicted, is used as a nonvolatile memory 13, which stores parameters, machine control programs, tool correction data and other data that are to be maintained after power is removed.

An LCD/MDI unit 19 is disposed on the front of the controller 1 or in the same position as the position of a machine console and is used for displaying data and graphics, inputting data, and operating the controller 1. A graphic control circuit 20 converts digital signals of data such as numerical data and graphics data to raster signals for display, sends the raster signals to a display device 21, which displays the numerical values and graphics. The display device 21 is typically a liquid-crystal display device.

A keyboard 22 includes numerical keys, symbolic keys, character keys and function keys and is used for writing and editing processing programs, and operating the controller 1. A touch-sensitive pointing device 23 includes the function of sensing touches and operations such as dragging by an operator.

If the touch-sensitive pointing device 23 is implemented as a touch panel, the touch-sensitive pointing device 23 is overlaid on the screen of the display device 21, so that operations performed by an operator on software keys, software buttons, and software switches displayed on the screen of the display device 21 can be sensed by the touch-sensitive pointing device 23. Note that if the touch-sensitive pointing device 23 is implemented as a touch panel, the touch panel and the display device 21 may be integrated as a single device.

An axis control circuit 15 receives an axis move instruction from the CPU 10 and outputs the axis move instruction to a servo amplifier 16. The servo amplifier 16 amplifies the move instruction, drives a servomotor coupled to at least one machine 3, and controls relative motions of a tool of the machine 3 and a workpiece. Note that as many axis control circuits 15 and servo amplifiers 16 as the number of axes of the servomotor of the machine(s) 3 to be controlled are provided.

A programmable machine controller (PMC) 17 receives signals such as a M (auxiliary) function signal, an S (spindle speed control) function signal, and a T (tool selection) function signal from the CPU 10 through a bus 18. The PMC 17 processes these signals using a sequence program and outputs output signals to control equipment such as pneumatic equipment, hydraulic equipment and electromagnetic actuators in the machine 3. Further, the PMC 17 receives various signals such as button signals and switch signals from a machine operation console in the machine 3, performs sequence processing, and transfers required input signals to the CPU 10 through the bus 18.

Note that components such as a spindle motor control circuit and a spindle motor amplifier are omitted from FIG. 1.

A teaching operation console 2 is connected to the controller 1 through an interface 14, so that a teaching operator can perform operations such as an operation for selecting a machine to be taught and an operation for teaching a position of the machine through the teaching operation console 2. The teaching operation console 2 includes a display device for displaying at least information sent from the controller 1 and an input device such as keys and a jog dial used for various operations, and sends information relating to operations input through the input device to the controller 1.

Figure 2:
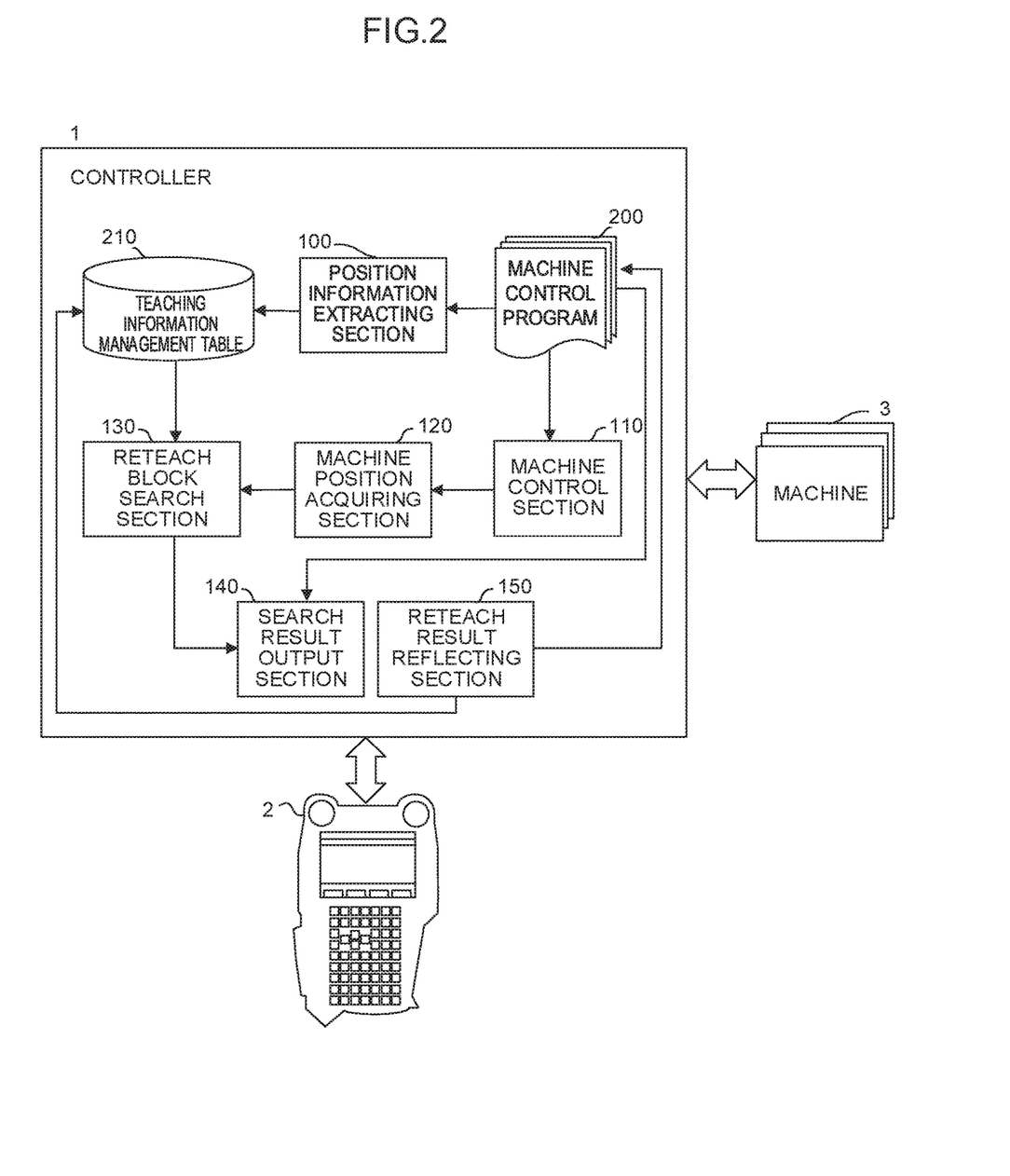
FIG. 2 is a functional block diagram of a controller according to an example embodiment of the present invention.

FIG. 2 is a schematic functional block diagram of a controller according to an example embodiment of the present invention, where a system program for implementing a reteach block search function is implemented in the controller 1 illustrated in FIG. 1. In the present invention, linkage information indicating blocks to be linked to one another across mechanisms which is set in a program for each mechanism is used in a process for searching for blocks to be retaught. In an example embodiment described below, wait blocks which represent blocks in which one mechanism waits for another are used as linkage information, and for the purpose of speed up of the reteach block search function, teaching management information in which wait block information as linkage information and taught positions of the mechanisms at the wait time point indicated by the wait blocks are associated with each other in advance is extracted from the program for each mechanism and is managed in a teaching information management table, and a search process is performed with reference to the teaching information management table during reteaching.

The functional blocks illustrated in FIG. 2 are implemented by the CPU 10 of the controller 1 illustrated in FIG. 1 executing the system program of the reteaching block search function to control operations of components of the controller 1. The controller 1 of the present example embodiment includes a position information extracting section 100, a machine control section 110, a machine position acquiring section 120, a reteach block search section 130, a search result output section 140, and a reteach result reflecting section 150.

The position information extracting section 100 is a functional means for reading at least one machine control program 200 from a nonvolatile memory 13 or the like and analyzing the at least one machine control program 200 to generate a teaching information management table 210. The teaching information management table 210 is generated as follows: a block that instructs a mechanism to instruct a mechanism to wait for another is identified in a machine control program 200 that drives each mechanism of the machine 3, then a wait number (information that can uniquely identify a wait, namely wait identification information) of the wait block and a taught position of each mechanism at the time of the wait are extracted from each machine control program 200, and the wait numbers and the taught positions are associated with each other and put in the teaching information management table 210.

The teaching information management table 210 generated by the position information extracting section 100 contains teaching management information concerning blocks that instruct all of the waits contained in the machine control programs 200.

Figure 3:
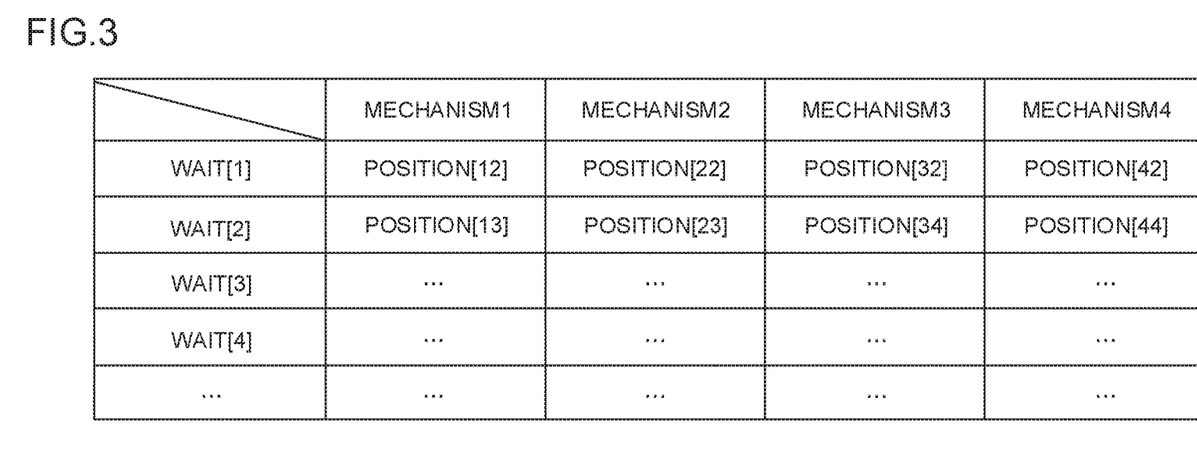
FIG. 3 is a diagram illustrating an example of a teaching information management table.

FIG. 3 is a diagram illustrating an example of a teaching information management table 210 generated by the position information extracting section 100. In the teaching information management table 210 illustrated in FIG. 3, for example position [12] is taught to mechanism 1, position [22] is taught to mechanism 2, position [32] is taught to mechanism 3 and position [42] is taught to mechanism 4 at the time of wait [1].

The machine control section 110 is a control means for driving and controlling the mechanisms of the machine 3 in accordance with operations on the teaching operation console 2 and the machine control programs 200. For example, the machine control section 110 drives and controls each mechanism of the machine 3 in accordance with a specification of the mechanism to be controlled or a manual pulse which is input using the teaching operation console 2 when a teaching operator teaches or reteaches a position of each mechanism of the machine 3. Further, for example at the time of execution of the machine control programs 200, the machine control section 110 reads each of the machine control programs 200 from a nonvolatile memory 13 or the like and analyzes the machine control program 200 to drive and control each mechanism of the machine 3 in accordance with the result of the analysis.

The machine position acquiring section 120 is a functional means for acquiring the current position of each mechanism of the machine 3 controlled by the machine control section 110. The machine position acquiring section 120 may acquire the current position of each mechanism of the machine 3 from feedback from a servomotor that drives each mechanism of the machine 3 or from coordinate values of each mechanism of the machine 3 that are managed within the controller 1.

The reteach block search section 130 is a functional means for receiving a command to search for blocks to be retaught from the teaching operation console 2 and executing a reteach block search process on the basis of the current position of each mechanism of the machine 3 acquired by the machine position acquiring section 120 and the teaching information management table 210. The reteach block search section 130 compares taught position information of each mechanism in the teaching management information stored in the teaching information management table 210 with the current position of each mechanism of the machine 3 acquired by the machine position acquiring section 120 and assigns a rank order number to each piece of the teaching management information on the basis of proximity from the current position of each mechanism of the machine 3. The "proximity from the current position of each mechanism of the machine 3" herein may be the smallness of the sum of three-dimensional distances measured for each mechanism or may be the largeness of the number of matching positions of the mechanisms. Alternatively, the "proximity" may be the smallness of the sum of three-dimensional distances measured for each mechanism multiplied by a weight or may be defined as appropriate on the basis of the significance or nature of each mechanism in the entire machine.

Figure 4:
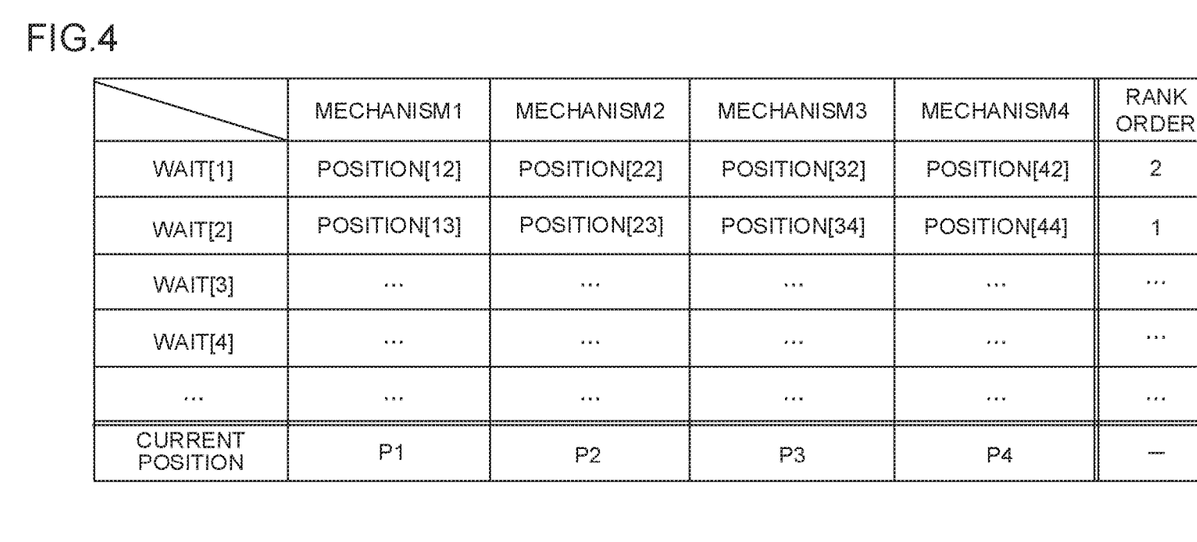
FIG. 4 is a diagram illustrating an example of a teaching information management able in which rank order numbers are assigned to pieces of teaching management information.

FIG. 4 is a diagram illustrating an example of teaching management information to which rank order numbers are assigned as a result of a reteach block search process performed by the reteach block search section 130. In the example in FIG. 4, the current position P1 of mechanism 1, the current position P2 of mechanism 2, the current position P3 of mechanism 3 and the current position P4 of mechanism 4 are compared with positions recorded in each piece of teaching management information and, as a result, rank order number 1 is assigned to the teaching management information of wait [2] which contains the nearest taught position, and rank order number 2 is assigned to the teaching management information of wait [1] which contains the second nearest taught position.

The search result output section 140 is a functional means for outputting a result of the reteach block search process performed by the reteach block search section 130. The search result output section 140 may output the result of the reteach block search process to the teaching operation console 2 or to the display device 21 of the controller 1. When outputting the result of the reteach block search process, the search result output section 140 may output information concerning a relevant block of each machine control program 200 and its preceding and succeeding blocks along with the result. Further, the search result output section 140 may output the result of the reteach block search process in response to one request or may output a reteach block search process result (teaching management information) having a particular rank order number assigned by the reteach block search section 130 in response to a request.

The reteach result reflecting section 150 is a functional means for reteaching each block of the machine control program 200 that corresponds to teaching management information selected by an operation performed on the teaching operation console 2, the keyboard 22, the touch-sensitive pointing device 23 or the like by using the current position of each mechanism of the machine 3. When reteaching each block of the machine control programs 200, the reteach result reflecting section 150 reteaches a taught position in the corresponding piece of the teaching management information in the teaching management information table.

Figure 5:
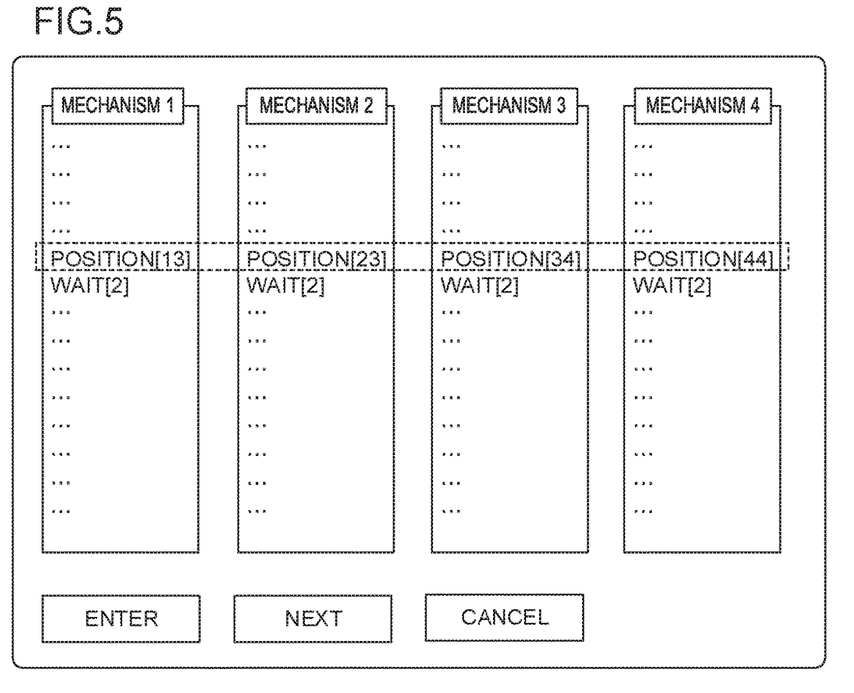
FIG. 5 is a diagram illustrating an example in which a first candidate to be retaught is displayed.
Figure 6:
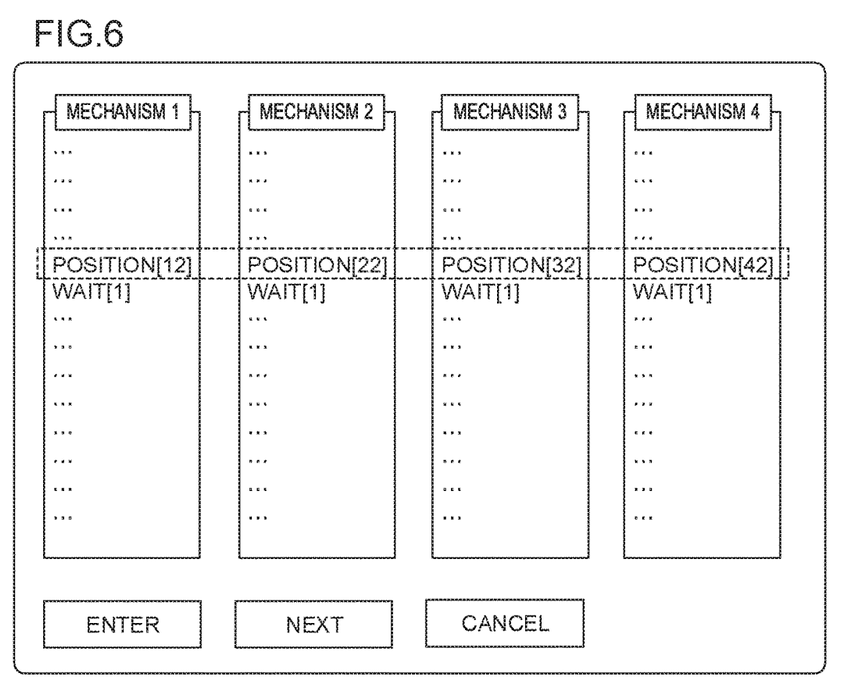
FIG. 6 is a diagram illustrating an example in which a second candidate to be retaught is displayed.

FIG. 5 illustrates an example of display of a result of a reteach block search process by the teaching operation console 2 that has received a result of a reteach block search process output from the search result output section 140. In the example of display in FIG. 5, the teaching operation console 2 displays teaching management information to which rank order number 1 is assigned by the reteach block search section 130 along with blocks near wait blocks of the teaching management information in the machine control programs 200. When these blocks are a desired block combination, the teaching operator operates the teaching operation console 2 to select "Enter", thereby completing the reteaching of the machine control programs 200. On the other hand, when the displayed blocks are not a desired block combination, the teaching operator may select "Next" to display the next candidate to be taught as illustrated in FIG. 6. By repeating such an operation, the teaching operator can easily find desired blocks from the machine control programs 200.

Figure 7:
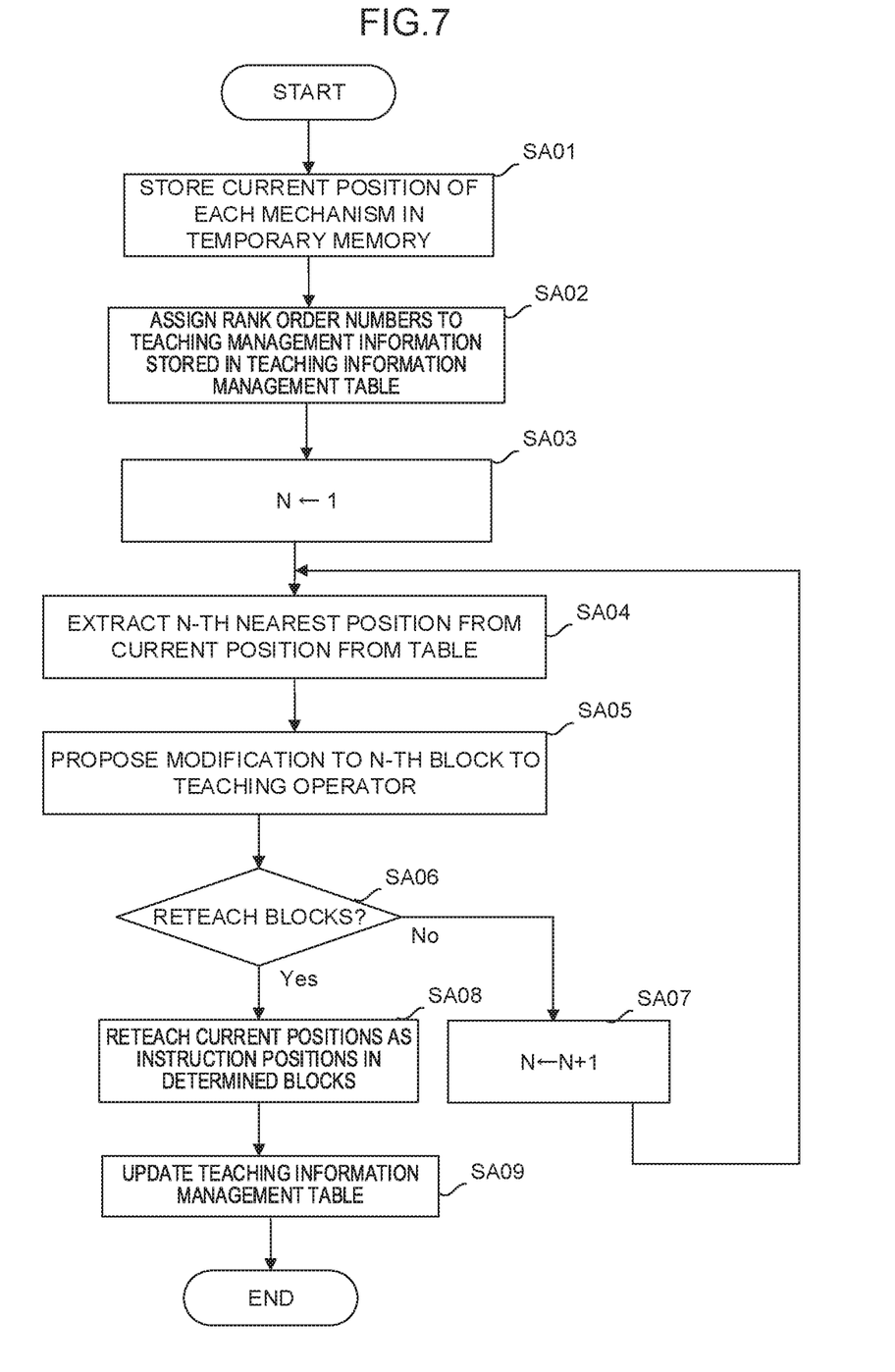
FIG. 7 is a flowchart of a reteach block search process executed on a controller according to an example embodiment of the present invention.

FIG. 7 is a schematic flowchart of a reteach block search process executed on a controller according to an example embodiment of the present invention. It is assumed here that before the process in flowchart of FIG. 7 is executed, the position information extracting section 100 has generated a teaching information management table 210 by reading the positions of mechanisms at each wait from machine control programs 200.

[Step SA01] The machine position acquiring section 120 acquires the current position of each mechanism of the machine 3.

[Step SA02] The reteach block search section 130 assigns a rank order number to each piece of the teaching management information stored in the teaching information management table 210 on the basis of proximity between the current position of each mechanism of the machine 3 acquired in step SA01 and a taught position in the teaching management information stored in the teaching information management table 210.

[Step SA03] The teaching operation console 2 sets 1 in a temporary variable N.

[Step SA04] The teaching operation console 2 requests a result of a reteach block search process using the value set in the temporary variable N as a rank order number from the search result output section 140. The search result output section 140 returns the requested result of the reteach block search process (and the machine control programs 200) to the teaching operation console 2.

[Step SA05] The teaching operation console 2 proposes blocks received in step SA04 to the teaching operator as candidate blocks to be retaught.

[Step SA06] The teaching operation console 2 determines whether or not the teaching operator has performed an operation indicating that the blocks proposed in step SA05 are blocks to be retaught. When the operation has been performed, the process proceeds to step SA08; otherwise, the process proceeds to step SA07.

[Step SA07] The teaching operation console 2 increments the temporary variable N by 1 and the process proceeds to step SA04.

[Step SA08] The reteach result reflecting section 150 sets (reteaches) the current position of each mechanism of the machine 3 that has been acquired in step SA01 in an instruction position that has been proposed as a candidate block to be retaught among the blocks of the machine control program 200 in step SA05 and has been determined to be a block to be retaught in step SA06.

[Step SA09] The reteach result reflecting section 150 updates, in the teaching management information stored in the teaching information management table 210, the position of each mechanism of the machine 3 contained in the teaching management information that corresponds to a block that has been proposed as a candidate block to be retaught in step SA05 and has been determined as a block to be retaught in step SA06 with the current position of each mechanism of the machine 3 that has been acquired in step SA01.

While example embodiments of the present invention have been described above, the present invention is not limited to the example embodiments described above and can be implemented in various modes by making modifications to the example embodiments as appropriate.

For example, while an example is given in the example embodiments described above in which wait blocks are used as linkage information and a teaching information management table is provided in advance, any information that defines linkage across mechanisms other than wait blocks may be used as linkage information. Further, the teaching information management table does not necessarily need to be generated and the reteach block search section 130 may extract linkage information and positions taught by blocks corresponding to the linkage information from machine control programs each time the reteach block search section 130 executes a reteach block search process.

While example embodiments of the present invention have been described above, the present invention is not limited to the example embodiments described above and can be implemented in other modes by making modifications to the example embodiment as appropriate.

What is claimed is:

1. A controller that reteaches taught positions in blocks contained in a plurality of machine control programs for controlling a plurality of mechanisms, each of the plurality of machine control programs including at least one piece of linkage information that indicates linkage between blocks of the machine control programs, the controller comprising:
 a teaching information management table in which the linkage information and taught positions in blocks of the plurality of machine control programs that are indicated by the linkage information as being linked to one another are associated with each other and managed;
 a machine position acquiring section that acquires current positions of the mechanisms;

a reteach block search section that assigns with reference to the teaching information management table rank order numbers to the linkage information on the basis of relation between the current positions of each of the mechanisms acquired by the machine position acquiring section and a taught position in a block of the plurality of machine control programs that relates to the linkage information;

a search result output section that outputs blocks of the plurality of machine control programs that relate to the linkage information on the basis of the rank order numbers assigned by the reteach block search section; and a reteach result reflecting section that reflects, in blocks of the plurality of machine control programs that have been selected as blocks to be retaught among the blocks output by the search result output section, the current positions of the mechanism that have been obtained by the machine position acquiring section as positions to be retaught.

2. The controller according to claim 1,
wherein the linkage information is wait identification information of wait blocks.

3. The controller according to claim 1,
wherein the reteach block search section assigns rank order numbers to blocks of the plurality of machine control programs on the basis of proximity between the current position of each of the mechanisms acquired by the machine position acquiring section and a taught position in a block of the plurality of machine control programs that relates to the linkage information.

4. The controller according to claim 3,
wherein the reteach block search section determines the proximity on the basis of a result of summation of three-dimensional distances between the current position of each of the mechanisms acquired by the machine position acquiring section and a taught position in a block of the plurality of machine control programs that relates to the linkage information.

5. The controller according to claim 3,
wherein the reteach block search section determines the proximity on the basis of a result of summation of weighted three-dimensional distances between the current position of each of the mechanisms acquired by the machine position acquiring section and a taught position in a block of the plurality of machine control programs that relates to the linkage information.

6. The controller according to claim 3,
wherein the reteach block search section determines the proximity on the basis of the number of mechanisms whose current positions acquired by the machine position acquiring section are identical to taught positions in blocks of the plurality of machine control program that relate to the linkage information.

\* \* \* \* \*